United States Patent
Sugawara et al.

(10) Patent No.: US 6,724,552 B1
(45) Date of Patent: Apr. 20, 2004

(54) MAGNETIC DISK APPARATUS WITH LOWER PROBABILITY OF OCCURRENCE OF READ ERRORS DUE TO SCRATCH OR THE LIKE ON MAGNETIC DISK SURFACE

(75) Inventors: Takayuki Sugawara, Fukushima-ken (JP); Takahiro Kawauchi, Fukushima-ken (JP); Masahiro Tenpaku, Kanagawa-ken (JP); Yoshiyasu Kubota, Kanagawa-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/416,654

(22) Filed: Oct. 12, 1999

(30) Foreign Application Priority Data

Oct. 14, 1998 (JP) .......................... 10-291846

(51) Int. Cl.$^7$ ................................ G11B 5/09
(52) U.S. Cl. .............................. 360/51; 360/53
(58) Field of Search .................... 360/53, 51

(56) References Cited

U.S. PATENT DOCUMENTS

| | | | |
|---|---|---|---|
| 4,663,752 A | * 5/1987 | Kakuse et al. | ............. 369/48 |
| 4,746,998 A | 5/1988 | Robinson et al. | ........... 360/72.1 |
| 5,666,238 A | 9/1997 | Igari et al. | ................ 360/77.08 |
| 5,726,818 A | 3/1998 | Reed et al. | .................... 360/51 |
| 5,825,568 A | * 10/1998 | Lee | ............................. 360/51 |
| 5,959,797 A | 9/1999 | Imai et al. | .................... 360/51 |
| 6,034,831 A | * 3/2000 | Dobbek et al. | ............... 360/53 |
| 6,115,199 A | * 9/2000 | Bang | ........................... 360/51 |

FOREIGN PATENT DOCUMENTS

| | | |
|---|---|---|
| JP | 06 150556 A | 9/1994 |
| JP | 08 031102 A | 6/1996 |
| JP | 9-73743 A | 3/1997 |

* cited by examiner

*Primary Examiner*—David Hudspeth
*Assistant Examiner*—Dan I Davidson
(74) *Attorney, Agent, or Firm*—Brinks Hofer Gilson & Lione

(57) ABSTRACT

A magnetic disk apparatus is capable of reading normal data following a read error of a reference signal that has occurred due to a scratch or the like on a disk surface. In the magnetic disk apparatus, if a reference signal (STM) fails to be read at point P, then an elapsed time (Tw) is measured, and a time T2 indicating the difference between a time T1 at which a read gate is supposed to be opened and the time Tw is determined. The read gate is opened after the time T2 has passed, thereby making it possible to properly read data and subject the read data to a decoding process.

5 Claims, 4 Drawing Sheets

MAGNETIC DISK APPARATUS WITH LOWER PROBABILITY OF OCCURRENCE OF READ ERRORS DUE TO SCRATCH OR THE LIKE ON MAGNETIC DISK SURFACE

BACKGROUND OF THE INVENTION

1. Field of the Invention

The present invention relates to a magnetic disk apparatus which is capable of reducing the probability of the occurrence of read errors caused by scratches or the like on a surface of a magnetic disk, and which employs a different standard for determining a defect when registering a defective sector during a disk inspection from a standard used for regular reproduction.

2. Description of the Related Art

In some types of flexible disks adapted for high-density recording, a sector in a recording track area thereof is provided with a servo field. A signal in the servo field is used for servo control when making a magnetic head seek a target track and for servo control during on-tracking.

Furthermore, a data field is provided, following the servo field in one sector. SYNC, a servo address mark (SAM), and servo information, namely, A burst and B burst, are recorded in the servo field. Synchronization is performed using the SYNC, positional information regarding the sector is read using the SAM, and a positional correction of the magnetic head is made using the A burst and the B burst.

The data field is further provided with a SYNC area and a data area (DATA). Following synchronization accomplished by the SYNC, a data body is read from the data area. In this case, settings are made such that a read gate of a reading circuit is opened in a predetermined time on the basis of detection of a reference signal (STM) at the beginning of the SAM or in the SAM. The read gate is opened when a head is positioned in the SYNC area of the data field. As a result, while the read gate is open, a signal of the data body is read from the data area, following the SYNC.

This type of a magnetic disk for high-density recording is subjected to writing and reading data for inspection during a quality inspection following a manufacturing process. In the quality inspection, a sector from which data cannot be properly read is determined to be a defective sector, and the number of the sector is registered as the number of a defective sector in a maintenance area of the magnetic disk. When the magnetic disk is loaded in a regular disk apparatus, the maintenance area is first read, the number of the defective sector is recognized and control is carried out so that the defective sector will not be used for recording.

However, when a flexible magnetic head for high-density recording is loaded in a disk apparatus to perform recording or reproduction, there are cases wherein a recording error or a reproduction error occurs in a sector that has not been determined to be defective in the quality inspection. These errors are attributable to several causes including scratches on a disk surface incurred during repeated use of a magnetic disk since the magnetic disk is repeatedly loaded in a disk apparatus, variations in quality of an apparatus used for recording or reproduction, or changeable factors of operating environments, such as temperature and humidity, of magnetic disks.

As a result, it sometimes happens that no ECC error takes place in a sector during the quality inspection, so that the sector is judged to be nondefective, whereas a read error occurs during actual reproduction due to a scratch mentioned above even in a field that has not been registered as the defective sector. For example, if the standard signal (STM) in a servo field fails to be read due to a scratch or the like, then a read gate fails to open in a predetermined time based on the reference signal. This leads to a problem in that normal data of a low probability of occurrence of an ECC error fails to be read.

SUMMARY OF THE INVENTION

Accordingly, the present invention has been made with a view toward solving the problem described above, and it is an object thereof to provide a magnetic disk apparatus capable of reading normal data following the occurrence of a read error of a reference signal (STM) in, for example, a servo field, the read error being attributable to a scratch or the like on a disk surface.

It is another object of the present invention to provide a magnetic disk apparatus that has a strict standard set for a read error of the STM in a quality inspection prior to the shipment of disks so as to make it possible to recognize a sector that incurs such a read error as a defective sector.

To these ends, according to one aspect of the present invention, there is provided a magnetic disk apparatus having a head for reading recorded information from a disk provided with a servo field and a SYNC area and a data area following the servo field, a gate for applying a signal read by the head to a signal processing unit, and a control unit for controlling the gate; wherein the control unit carries out control such that the gate is opened after a set period of time (T1) based on a time at which a reference signal (STM) in the servo field has been detected from the signal read by the head, or the gate is opened after the elapse of a time corresponding to the set period of time (T1) from a moment at which the reference signal (STM) is supposed to be detected if the reference signal (STM) cannot be detected after a predetermined period of time (T) following the detection of a preceding reference signal (STM).

For instance, the control unit determines a difference (T1−Tw=T2) between a period of time (Tw) further elapsed from the predetermined period of time (T) and the set period of time (T1), and conducts control to open the gate in the determined T2.

The present invention can be applied to a case wherein a read error of the STM in a servo field takes place due to a scratch or the like on a disk surface when an attempt is made to read, using a regular disk apparatus, data from an area which has incurred no ECC error during the quality inspection of the disk and presents a low ECC error rate, and which accordingly has not been registered as a defective sector in the maintenance area of the disk.

If a read error of the reference signal occurs, then the control unit determines how much time (Tw) has further passed after the predetermined time (T) passed from the preceding reference signal. The control unit then calculates the period of time obtained by subtracting the elapsed time (Tw) from the set period of time (T1), namely, (T1−Tw=T2). If the reference signal read error occurs, the control unit implements processing to open the read gate after the period of time (T2) passes. This enables a data body of the data area to be read.

Alternatively, if an STM read error happens after the predetermined period of time (T) has passed from a preceding reference signal, the control unit may continue measurement of time after the predetermined period of time (T) has passed, adds the set period of time (T1) after the predetermined period of time has passed, and opens the gate when a time obtained by (T+T1) has passed.

In a preferred form of the present invention, a magnetic disk is provided with a maintenance area in which a defective sector is registered during a disk inspection, and if the STM is not detected within the predetermined period of time (T), then a sector from which the STM has not been detected is registered as a defective sector in the maintenance area during the disk inspection.

In a further preferred form, the processing for opening the read gate by setting the time difference (T1−Tw=T2) is performed only in a regular disk apparatus in which a disk after shipment is loaded, and the time difference is not set in a quality inspection prior to the shipment of the magnetic disk. In the quality inspection before shipment, a sector in which the reference signal read error has occurred is recorded as a defective sector in a maintenance field.

Thus, by providing more strict processing for dealing with the reference signal read error during the quality inspection prior to shipment than for the control processing in the regular disk apparatus makes it possible to achieve a lower probability of the occurrence of read errors in a disk loaded in the regular disk apparatus.

DESCRIPTION OF THE PREFERRED EMBODIMENTS

Figure 1:
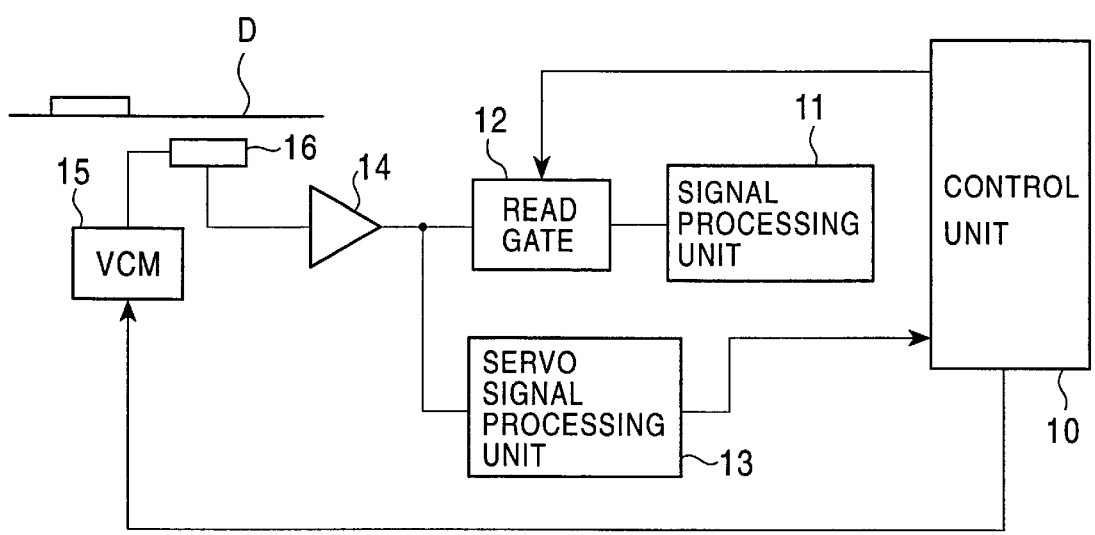
FIG. 1 is a block diagram showing an outline of a circuit configuration of a magnetic disk apparatus.
Figure 2:
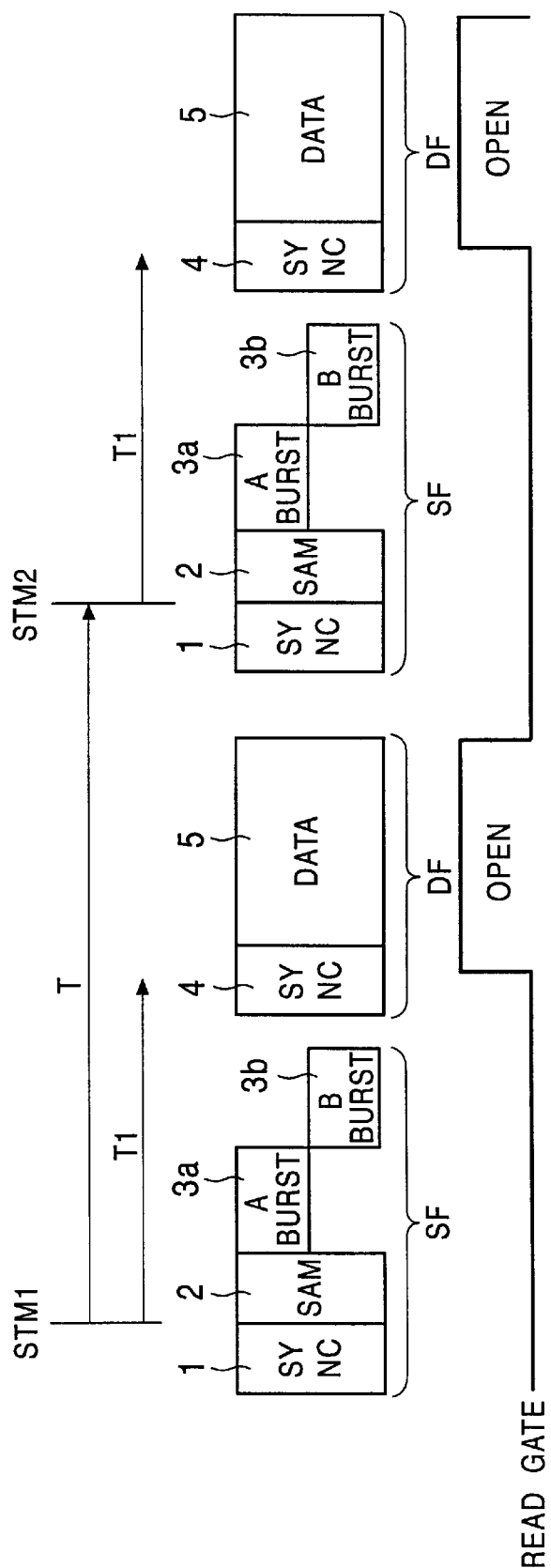
FIG. 2 is a schematic representation that illustrates normal reproduction processing.
Figure 3:
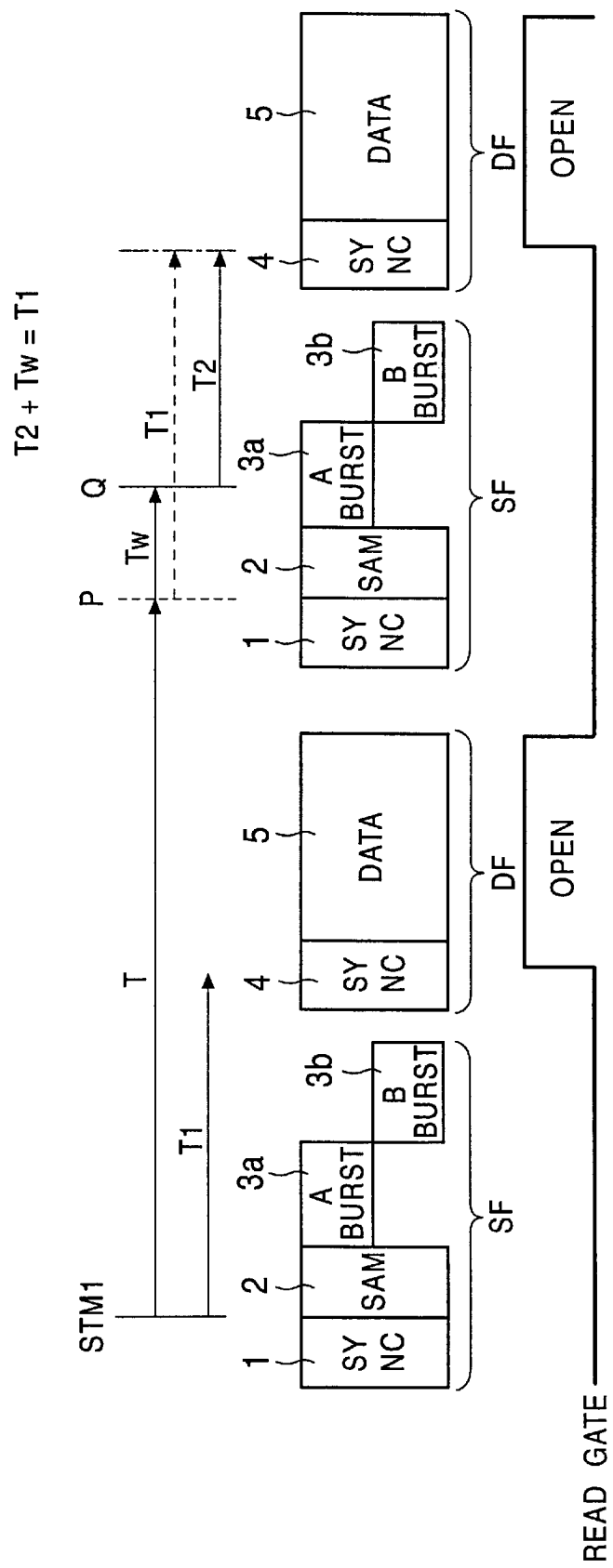
FIG. 3 is a schematic representation that illustrates processing for correcting a read gate timing during reproduction.
Figure 4:
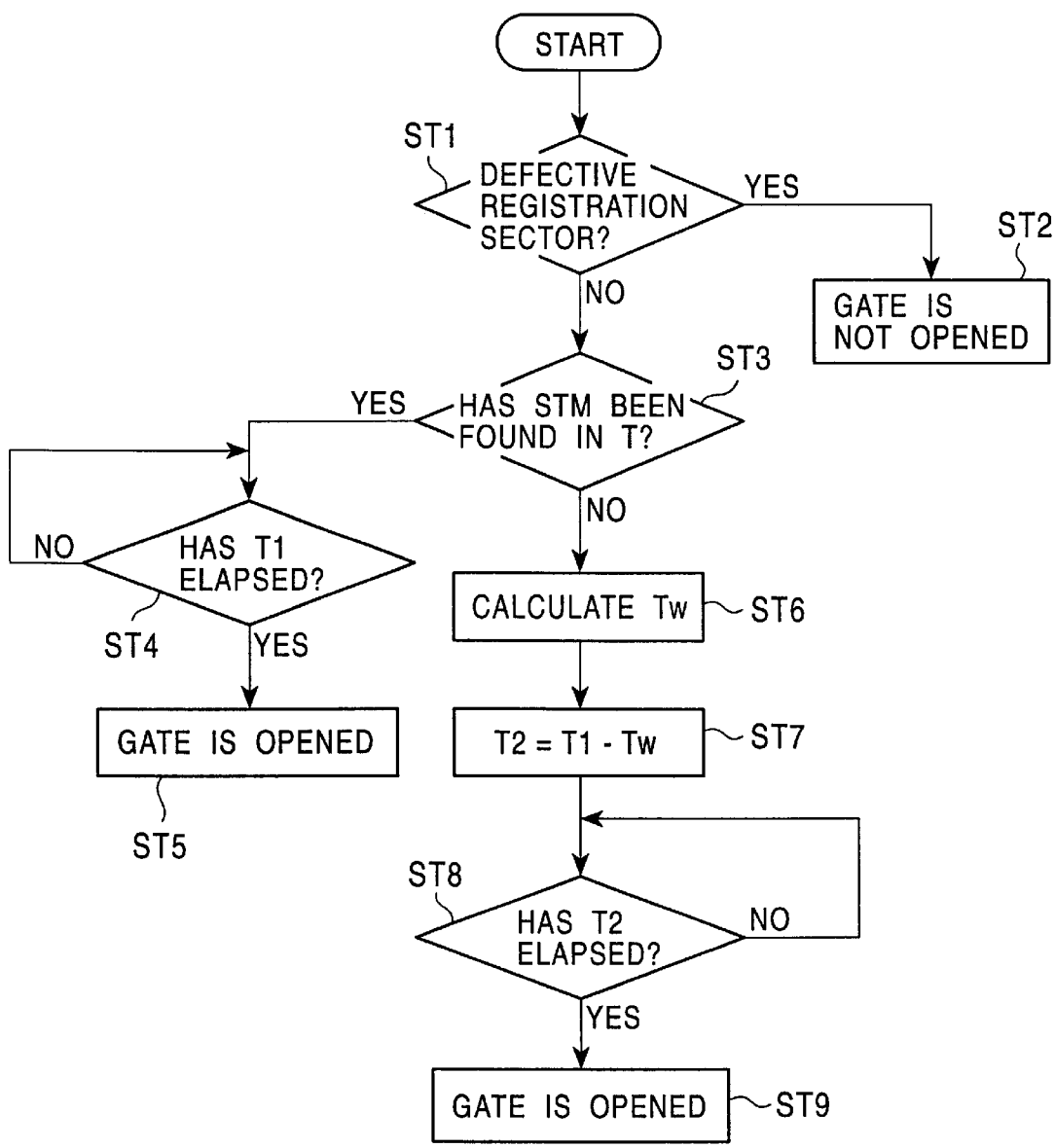
FIG. 4 is a flow chart that illustrates processing control for opening a gate.

A magnetic disk apparatus in accordance with the present invention will be described with reference to FIG. 1 through FIG. 4. FIG. 1 is a block diagram showing an outline of a circuit configuration of a magnetic disk apparatus; FIG. 2 is a schematic representation that illustrates normal reproduction processing for performing reproduction from a disk after shipment; FIG. 3 is a schematic representation that illustrates processing for correcting a read gate timing during reproduction from the disk after shipment if a read error has occurred; and FIG. 4 is a flow chart that illustrates control conducted by a control unit of the magnetic disk apparatus.

A magnetic disk apparatus shown in FIG. 1 is constituted primarily by a control unit 10, a signal processing unit 11, a read gate 12, a servo signal processing unit 13, an amplifier 14, a VCM 15, and a magnetic head 16 to reproduce information recorded in a disk D. The VCM means a voice coil motor, which is a linear motor driving unit for driving the magnetic head 16 in the radial direction of the disk D.

FIG. 2 shows a servo field and a data field provided for each sector of the disk D.

A data sector of the disk D has a formatted servo field SF and a formatted data field DF. SYNC 1, a servo address mark (SAM) 2, and A burst 3a and B burst 3b as servo information are recorded in the servo field SF. The data field DF has a formatted SYNC area 4 and a formatted data area 5 following the SYNC area 4, DATA having been recorded in the data area 5.

To reproduce information recorded on the disk D, a signal recorded on the disk D is read by the magnetic head 16, and the signal is amplified by the amplifier 14. Read outputs of the SYNC 1, the SAM 2, and the A burst 3a and the B burst 3b in the servo field SF are applied to the servo signal processing unit 13. The servo signal processing unit 13 sets a read timing on the basis of the output of the SYNC 1, reads the SAM 2 to recognize an address, and detects the output intensity levels of the A burst signal 3a and the B burst signal 3b and supplies them to the control unit 10. The control unit 10 calculates a difference between the output intensity level of the A burst signal 3a and the output intensity level of the B burst signal 3b. Based on a result of the calculation, the VCM 15 is servo-driven to make a tracking correction so as to make the head 16 follow a track center of the disk D.

Furthermore, the control unit 10 carries out processing for opening the read gate 12 at a predetermined timing. While the read gate 12 is open, signals recorded in the SYNC area 4 and the DATA area 5 of the data field DF are supplied to the signal processing unit 11 to perform processing for decoding the DATA.

Referring now to the flow chart of FIG. 4, the control operation for opening the read gate 12 will be described. In FIG. 4, each step of the control operation implemented by the control unit 10 will be denoted as ST.

The disk D loaded in the disk apparatus has been subjected to recording and reproduction of inspection signals during a quality inspection prior to shipment. Data check has been conducted on the basis of a reproduction output, and a sector with a high ECC error rate has been recorded as a defective sector in the maintenance area of the disk.

When the disk after shipment is loaded in a regular disk apparatus employed by a user, the maintenance area is read by the head 16 shown in FIG. 1, the defective sector which has been recorded in the maintenance area is recognized, and the number of the defective sector is stored in a RAM in the control unit 10.

In ST1 of FIG. 4, it is determined whether a sector on the disk D to be read is the defective sector stored in the RAM. If the sector is determined to be the defective sector, then the program proceeds to ST2 wherein the read gate 12 is not opened for the sector, so that the data field DF is not read.

In ST1, if it is found that the sector to be read has not been registered as a defective sector, then the reference signal (STM) is detected from a reproduction signal of the servo field SF supplied from the servo signal processing unit 13 to the control unit 10. The STM is a rise signal or the like of the servo address mark (SAM). As shown in FIG. 2, as the head 16 continues to read from a rotating disk D, the STM is detected at intervals based on the predetermined period of time (T).

In ST3 of FIG. 4, it is monitored whether the STM is detected when the predetermined period of time (T) has passed from the preceding STM.

When the STM is detected, counting is performed for a set period of time (T1) from the detection as illustrated in FIG. 2. The counting is carried out on the basis of a clock based on a reproduction signal of the SYNC 1 of the servo field SF. In ST4, when the counting result indicates that the set period of time (T1) has passed after the STM was detected, the read gate 12 is opened for a predetermined time by the control unit 10 in ST5.

As a result, an output from the amplifier 14 is supplied to the signal processing unit 11. The timing for opening the read gate 12 after the set period of time (T1) is set so that the read gate 12 is opened during or immediately before the reproduction from the SYNC area 4 of the data field DF. Thus, an output of the SYNC area 4 is first supplied to the signal processing unit 11, then a DATA body of the following DATA area 5 is read by the signal processing unit 11 on the basis of a timing set by the SYNC output and subjected to a decoding process.

If the STM is not detected with in the predetermined period of time (T) in ST3 above, i.e., if the STM cannot be detected at a time P of FIG. 3, then the time Tw elapsed from the time P to a time Q at which the head moves thereafter is calculated, and calculation of T1−Tw=T2 is performed in ST7. When it is determined in ST8 that the time T2 has passed, the read gate 12 is opened in ST9, and an output read from the data field DF is supplied to the signal processing unit 11.

Alternatively, the time Tw may be fixed beforehand, and if the STM has not been able to be read, then the time T2 may be measured after the time Tw has passed, and the read gate 12 may be opened. Further alternatively, if the STM has not been able to be read, time measurement may be continued after the set period of time (T) has passed, and the read gate 12 may be opened when a predetermined time (T+T1) has passed.

Thus, even if a read error of the STM occurs after the predetermined period of time (T) has passed, the read gate 12 can be properly opened to enable reading of normal data recorded in the SYNC area 4 and the DATA area 5 of the data field DF.

Moreover, in the quality inspection preceding the shipment of this type of disk D, data for inspection is recorded and reproduced, and a sector with a high read data error rate-is recorded in a maintenance area of the disk. In the quality inspection, if the reference signal (STM) is not detected after the predetermined period of time (T) shown in FIG. 2 and FIG. 3 has passed, then the sector is recorded as a defective sector in the maintenance area, without carrying out the correction processing shown in FIG. 4. Hence, when the disk is loaded in a user's disk apparatus after shipment, the sector registered as defective is recognized in ST1 of FIG. 4 by a signal read from the maintenance area, so that the read gate is not opened for the sector in ST2.

In other words, the correction processing shown in FIG. 3 and FIG. 4 is implemented only when the reference signal cannot be read due to a scratch or the like on the disk after shipment. The disk before shipment is subjected to a quality inspection which does not include the processing of FIG. 4 and which employs a stricter standard to find a defective sector.

As set forth above, the present invention is able to properly open a gate to read data even if a read error of a signal that provides a reference for opening the gate occurs due to a scratch or the like on a disk.

In the inspection of a disk prior to shipment, if a read error of the reference signal occurs in a sector, the sector is registered as a defective sector in the disk. Hence, when the disk is loaded in a user's disk apparatus, the sector is processed as a defective sector, thus making it possible to reduce the probability of the occurrence of a read error.

What is claimed is:

1. A magnetic disk apparatus comprising:
 a head for reading recorded information from a disk provided with a servo field and a SYNC area, and a data area following said servo field;
 a gate for applying a signal read by said head to a signal processing unit; and
 a control unit for controlling said gate;
 wherein said control unit carries out control such that said gate is opened after an elapse of a set period of time (T1) as measured from a moment in time at which a reference signal (STM2) in said servo field has been detected from the signal read by said head, and
 wherein, if said reference signal (STM2) has not been detected after an elapse of a predetermined period of time (T) following the detection of a preceding reference signal (STM1), said predetermined time (T) corresponding to a period of time within which reference signal (STM2) should have been detected, then said gate is opened after elapse of a period of time corresponding to said predetermined period of time (T) and said set period of time (T1), as measured from a moment in time at which said preceding reference signal (STM1) was detected.

2. A magnetic disk apparatus according to claim 1, wherein said control unit determines a difference in time (T2), as calculated by subtracting the difference (T1−Tw=T2) between a time (Tw) that has passed after the elapse of said predetermined time (T) and said set period of time (T1), and conducts control for opening said gate at said time (T2) as measured from the elapse of time (Tw).

3. A magnetic disk apparatus according to claim 1, wherein a magnetic disk is provided with a maintenance area in which a defective sector is registered during a disk inspection, and if said reference signal (STM) is not detected within said predetermined period of time (T), then a sector from which said reference signal (STM) has not been detected is registered as a defective sector in said maintenance area during said disk inspection.

4. A magnetic disk apparatus comprising:
 a head for reading recorded information from a disk, said disk having a servo field having a reference signal, and a data area following said servo field;
 a gate for applying a signal read by said head to a signal processing unit; and
 a control unit for controlling said gate;
 wherein the gate is opened after the elapse of a first predetermined period of time (T1), being measured from a moment in time at which a reference signal (STM2) in the servo field is detected from the signal read by said head, and
 wherein the gate is opened after the elapse of a second predetermined period of time (T3) as measured from a moment in time at which a reference signal (STM1) in an immediately preceding servo field was detected, providing that the reference signal STM2 is not detected within the predetermined time interval T as measured from the occurrence of reference signal STM1, where T3=T+T1.

5. A magnetic disk apparatus according to claim 4, wherein a magnetic disk is provided with a maintenance area in which a defective sector is registered during a disk inspection, and if said reference signal (STM2) is not detected within said predetermined period of time (T) as measured from the detection of a preceding reference signal, then a sector from which said reference signal (STM2) has not been detected is registered as a defective sector in said maintenance area during said disk inspection.

* * * * *